United States Patent
Owens et al.

(10) Patent No.: US 10,621,417 B2
(45) Date of Patent: Apr. 14, 2020

(54) SYSTEMS AND METHODS FOR GENERATING CONTENT

(71) Applicant: Facebook, Inc., Menlo Park, CA (US)

(72) Inventors: Erich James Owens, Oakland, CA (US); Omry Yadan, Mountain View, CA (US)

(73) Assignee: Facebook, Inc., Menplo Park, CA (US)

( * ) Notice: Subject to any disclaimer, the term of this patent is extended or adjusted under 35 U.S.C. 154(b) by 0 days.

(21) Appl. No.: 15/488,479

(22) Filed: Apr. 16, 2017

(65) Prior Publication Data

US 2018/0300536 A1    Oct. 18, 2018

(51) Int. Cl.
*G06K 9/00* (2006.01)
*G06K 9/62* (2006.01)

(52) U.S. Cl.
CPC ..... *G06K 9/00275* (2013.01); *G06K 9/00268* (2013.01); *G06K 9/00228* (2013.01); *G06K 9/6218* (2013.01)

(58) Field of Classification Search
None
See application file for complete search history.

(56) References Cited

U.S. PATENT DOCUMENTS

| | | | | |
|---|---|---|---|---|
| 2008/0089561 A1* | 4/2008 | Zhang | ............... | G06F 17/30259 382/118 |
| 2010/0086175 A1* | 4/2010 | Yokono | ............... | G06K 9/00369 382/103 |
| 2010/0302138 A1* | 12/2010 | Poot | ............... | G06F 3/011 345/156 |
| 2012/0027249 A1* | 2/2012 | Brown | ............... | G06K 9/00771 382/103 |
| 2014/0046935 A1* | 2/2014 | Bengio | ............... | G06F 17/30277 707/723 |
| 2014/0204119 A1* | 7/2014 | Malamud | ............... | G06T 19/006 345/633 |
| 2014/0300612 A1* | 10/2014 | Li | ............... | A63F 13/79 345/473 |
| 2018/0039867 A1* | 2/2018 | Cheng | ............... | G06K 9/66 |
| 2018/0098059 A1* | 4/2018 | Valdivia | ............... | G06F 3/017 |

OTHER PUBLICATIONS

Taigman, Yaniv et al., "DeepFace: Closing the Gap to Human-Level Performance in Face Verification," 2014 IEEE Conference on Computer Vision and Pattern Recognition (CVPR), Jun. 2014.
Taigman, Yaniv et al., "Unsupervised Cross-Domain Image Generation," arXiv:1611.02200v1, Nov. 7, 2016 [retrieved online at https://arxiv.org/pdf/1611.02200.pdf on Jul. 17, 2017].

* cited by examiner

*Primary Examiner* — Jiangeng Sun
(74) *Attorney, Agent, or Firm* — Sheppard Mullin Richter & Hampton LLP

(57) ABSTRACT

Systems, methods, and non-transitory computer-readable media can generate a set of clusters using sample content items in which a set of user features are represented, the sample content items being clustered based at least in part on their similarity to one another; obtain one or more content items that capture a set of user features corresponding to a given user; determine that the user corresponds to a given cluster in the set of clusters based at least in part on the features of the user; and assign an avatar associated with the cluster to the user.

20 Claims, 8 Drawing Sheets

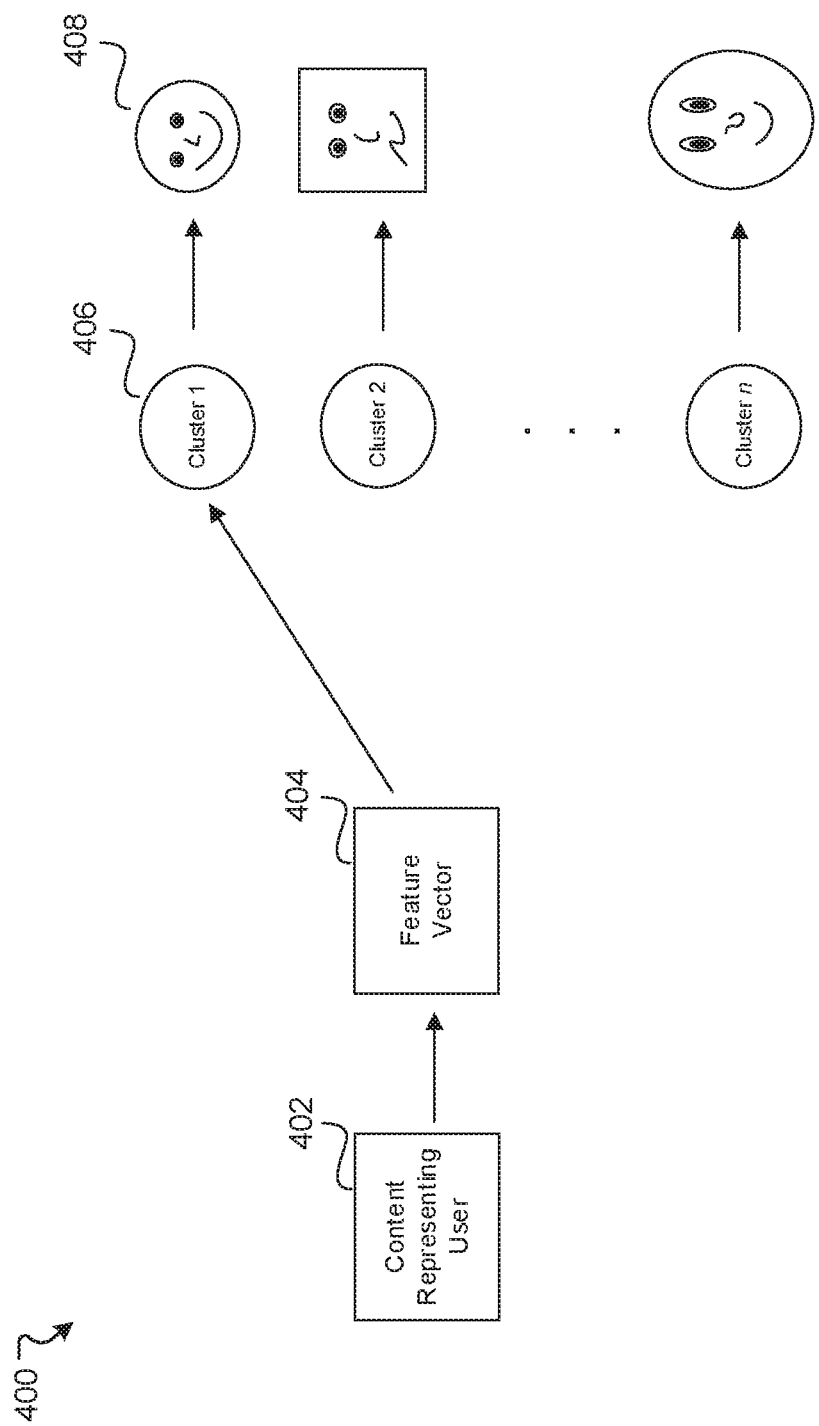

SYSTEMS AND METHODS FOR GENERATING CONTENT

FIELD OF THE INVENTION

The present technology relates to the field of content generation. More particularly, the present technology relates to techniques for generating visual content.

BACKGROUND

Today, people often utilize computing devices (or systems) for a wide variety of purposes. Users can use their computing devices to, for example, interact with one another, access content, share content, and create content. In some cases, content items can include postings from members of a social network. The postings may include text and media content items, such as images, videos, and audio. The postings may be published to the social network for consumption by others.

SUMMARY

Various embodiments of the present disclosure can include systems, methods, and non-transitory computer readable media configured to generate a set of clusters using sample content items in which a set of user features are represented, the sample content items being clustered based at least in part on their similarity to one another; obtain one or more content items that capture a set of user features corresponding to a given user; determine that the user corresponds to a given cluster in the set of clusters based at least in part on the features of the user; and assign an avatar associated with the cluster to the user.

In an embodiment, each cluster in the set of clusters is associated with a respective avatar.

In an embodiment, the user features include at least one or more facial features or body features.

In an embodiment, the content items include one or more images of the user, videos that include at least one video frame of the user, or live stream broadcasts that include at least one video frame of the user.

In an embodiment, the systems, methods, and non-transitory computer readable media are configured to obtain respective feature vectors for the sample content items and cluster the respective feature vectors into the set of clusters.

In an embodiment, the systems, methods, and non-transitory computer readable media are configured to determine a feature vector based at least in part on the content items corresponding to the user and determine the given cluster based at least in part on a distance between a feature vector corresponding to a centroid of the given cluster and the feature vector corresponding to the user.

In an embodiment, the distance is determined based on a dot product between the feature vector corresponding to the given cluster and the feature vector corresponding to the user.

In an embodiment, the systems, methods, and non-transitory computer readable media are configured to determine one or more secondary features for the user and apply one or more customizations to the avatar based at least in part on the secondary features.

In an embodiment, the systems, methods, and non-transitory computer readable media are configured to process the one or more content items corresponding to the user using one or more machine learning classifiers that have been trained to recognize one or more of the secondary features.

In an embodiment, the secondary features include at least accessories worn by the user, cosmetic features, facial hair, type of clothing, and clothing colors.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIGS. 4A-4B illustrate example diagrams, according to various embodiments of the present disclosure.

Figure 1:
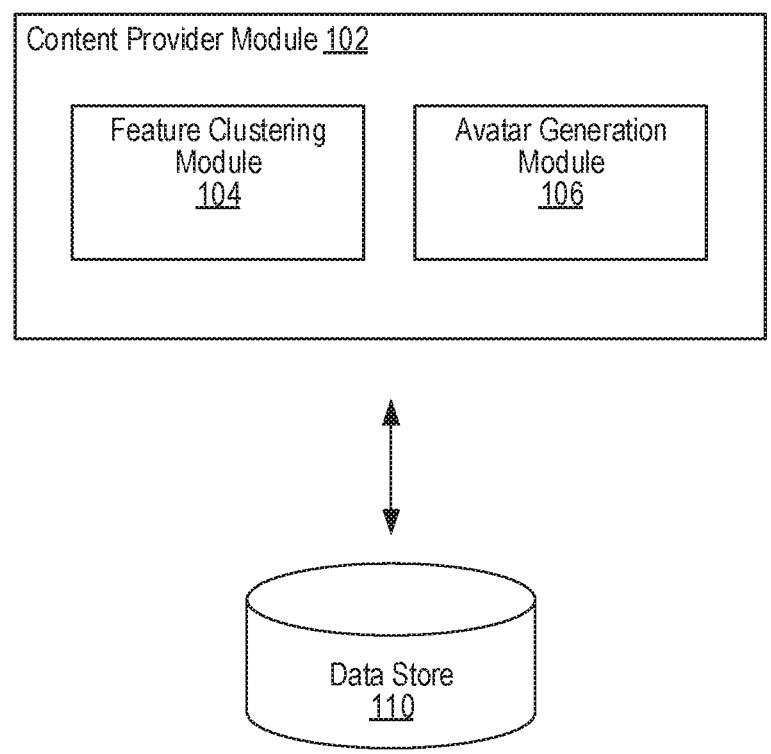
FIG. 1 illustrates an example system including an example content provider module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Generating Content

Today, people often utilize computing devices (or systems) for a wide variety of purposes. Users can use their computing devices to, for example, interact with one another, access content, share content, and create content. In some cases, content items can include postings from members of a social network. The postings may include text and media content items, such as images, videos, and audio. The postings may be published to the social network for consumption by others.

People often use avatars as digital representations of themselves in electronic environments. For example, a person's avatar can be an icon or figure that represents the person in video games, Internet forums, social networks, to name some examples. Under conventional approaches, a person can select their avatar from a number of pre-generated avatars. This process typically requires the person to manually identify an avatar that best reflects the person's features (e.g., facial features, torso features, etc.). In some instances, the person can select options to modify various attributes of their selected avatar including, for example, skin tone, hair style, and facial haft. These conventional approaches, however, require individuals to manually select and customize their desired avatar. Such restrictions can limit user engagement and may affect user experience. Accordingly, such conventional approaches may not be effective in addressing these and other problems arising in computer technology.

An improved approach rooted in computer technology overcomes the foregoing and other disadvantages associated with conventional approaches specifically arising in the realm of computer technology. For example, a set of clusters can be generated using sample content items in which a set of user features are represented. The sample content items can be clustered based at least in part on their similarity to one another. One or more content items that capture a set of user features corresponding to a given user can be obtained. A determination can be made that the user corresponds to a given cluster in the set of clusters based at least in part on the features of the user. An avatar associated with the cluster can be assigned to the user. More details relating to the disclosed technology are provided below.

FIG. 1 illustrates an example system 100 including an example content provider module 102, according to an embodiment of the present disclosure. As shown in the example of FIG. 1, the content provider module 102 can include a feature clustering module 104 and an avatar generation module 106. In some instances, the example system 100 can include at least one data store 110. The components (e.g., modules, elements, etc.) shown in this figure and all figures herein are exemplary only, and other implementations may include additional, fewer, integrated, or different components. Some components may not be shown so as not to obscure relevant details.

In some embodiments, the content provider module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the content provider module 102 can be implemented, in part or in whole, as software running on one or more computing devices or systems, such as on a user or client computing device. In one example, the content provider module 102 or at least a portion thereof can be implemented as or within an application (e.g., app), a program, or an applet, etc., running on a user computing device or a client computing system, such as the user device 610 of FIG. 6. In another example, the content provider module 102 or at least a portion thereof can be implemented using one or more computing devices or systems that include one or more servers, such as network servers or cloud servers. In some instances, the content provider module 102 can, in part or in whole, be implemented within or configured to operate in conjunction with a social networking system (or service), such as the social networking system 630 of FIG. 6.

The content provider module 102 can be configured to communicate and/or operate with the at least one data store 110, as shown in the example system 100. The at least one data store 110 can be configured to store and maintain various types of data. For example, the data store 110 can store information describing various content that has been posted by users of a social networking system, content posted by users in which various features of the users are captured (e.g., self-portrait images, videos, etc.), and content representing user avatars. In some implementations, the at least one data store 110 can store information associated with the social networking system (e.g., the social networking system 630 of FIG. 6). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 110 can store information associated with users, such as user identifiers, user information, profile information, user specified settings, content produced or posted by users, and various other types of user data.

In various embodiments, the feature clustering module 104 can be configured to cluster content in which features (e.g., human features) of various users are captured into a set of clusters. These clusters can be used to automatically assign users to avatars. More details regarding the feature clustering module 104 will be provided below with reference to FIG. 2.

In some embodiments, the avatar generation module 106 can be configured to assign avatars to users. In some embodiments, the avatar generation module 106 can also automatically customize avatars for users. More details regarding the avatar generation module 106 will be provided below with reference to FIG. 3.

Figure 2:
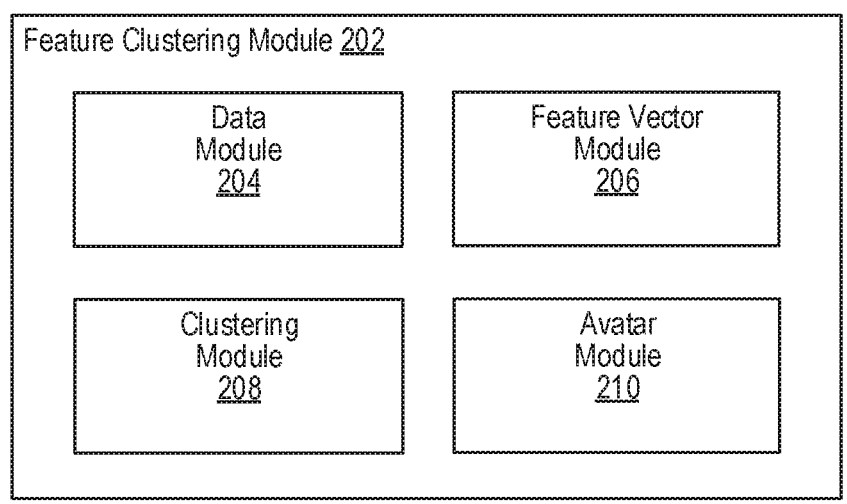
FIG. 2 illustrates an example of a feature clustering module, according to an embodiment of the present disclosure.

FIG. 2 illustrates an example of a feature clustering module 202, according to an embodiment of the present disclosure. In some embodiments, the feature clustering module 104 of FIG. 1 can be implemented as the feature clustering module 202. As shown in FIG. 2, the feature clustering module 202 can include a data module 204, a feature vector module 206, a clustering module 208, and an avatar module 210.

In various embodiments, the feature clustering module 202 can be configured to cluster content items that capture features of various users. For example, the feature clustering module 202 can cluster self-portrait images (or selfies) that capture user features (e.g., human faces) based on their similarity. In this example, images that capture user features that are similar to one another can be assigned to the same cluster. In some embodiments, each of these clusters can be associated with a respective avatar that is created to be representative of user features corresponding to the cluster. In some embodiments, an avatar associated with a given cluster is a visual representation of user features (e.g., human faces) that correspond to the cluster. In various embodiments, these clusters can be used to automatically assign avatars to users, as described below. Naturally, the user features used to generate clusters need not be limited to content in which human faces are captured. For example, depending on the implementation, content capturing any distinguishable features (e.g., human features, non-human features, etc.) can be used to assign avatars to users including, for example, content capturing full profiles of users (e.g., full body photos).

In some embodiments, the data module 204 can be configured to obtain a set of content items in which various user features of users are captured. In such embodiments, these content items can be clustered based on similarity, as described below. For example, the data module 204 may obtain one or more images of users (e.g., self-portrait images or selfies) in which various user features (e.g., facial features, body features, etc.) of those users are captured. In another example, the data module 204 can obtain one or more videos of users in which various features of those users are captured. Similarly, the data module 204 can obtain one or more live stream broadcasts of users in which various features of those users are captured. In general, content obtained by the data module 204 may be publically available content and/or content that is obtained from users of a social networking system (e.g., the social networking system 630 of FIG. 6) after obtaining their consent. In some embodiments, the data module 204 can be configured to automatically select content items in which user features (e.g., human faces) are captured. For example, in some embodiments, the data module 204 can identify content items that capture user features and that received a threshold amount of user engagement (e.g., user likes, views, shares, etc.). In general, the amount of content items selected by the data module 204 can vary depending on the implementation. For example, the data module 204 may obtain millions of content items in which user features are captured.

In some embodiments, the feature vector module 206 can be configured to obtain respective feature vectors for content items obtained by the data module 204. In some embodiments, a respective feature vector is obtained for each content item in which user features are captured. For example, a feature vector can be generated from a self-portrait image of a given user using a trained neural network. Each feature vector can have some pre-defined number of dimensions (e.g., 64-dimensional feature vector, 128-dimensional feature vector, 256-dimensional feature vector, etc.). Such feature vectors may be determined using generally known approaches for face detection and face recognition. One example approach for generating and applying feature vectors is described in Y. Taigman, M. Yang, M. Ranzato, and L. Wolf "*DeepFace: Closing the Gap to Human-Level Performance in Face Verification*," Conference on Computer Vision and Pattern Recognition (CVPR), 2014, which is incorporated by reference herein.

In some embodiments, the clustering module 208 can be configured to cluster these feature vectors into a set of clusters. In some embodiments, the clustering module 208 clusters the feature vectors based on similarity. As a result, feature vectors corresponding to users that share features (e.g., facial features, body features, etc.) are assigned to the same cluster. Thus, for example, images of human faces that are similar to one another can be assigned to the same cluster. The clustering module 208 can apply any generally known approach for clustering data including, for example, k-means clustering. In general, the number of clusters generated by the clustering module 208 can vary depending on the implementation. For example, the clustering module 208 may generate thousands of clusters.

In some embodiments, the avatar module 210 can be configured to associate at least one avatar with each cluster generated by the clustering module 208. In various embodiments, such avatars can be created manually, for example, by some entity (e.g., a computer graphics artist). In particular, an avatar for a given cluster can be created so that the avatar is representative of user features corresponding to the cluster. For example, an avatar for a cluster that corresponds to a set of similar human faces can be created to be representative of some, or all, of those human faces.

In some embodiments, when creating an avatar for a given cluster, the avatar module 210 selects a set of feature vectors included in the cluster. Next, the avatar module 210 can determine a corresponding set of content items from which the set of feature vectors were determined. These content items can then be provided to an entity (e.g., computer graphics artist) to be used for creating the avatar. In one example, feature vectors that represent human faces may be assigned to a given cluster. When creating an avatar for the cluster, the avatar module 210 can select a set of feature vectors from the cluster. The avatar module 210 can determine content items from which the feature vectors were determined. In this example, these content items capture various human faces. An entity can then use these content items to create an avatar that is visually similar to the human faces represented in the content items. In some embodiments, when selecting feature vectors from a cluster to be used for creating an avatar, the avatar module 210 selects a pre-defined number of feature vectors that are nearest to a centroid of the cluster and a pre-defined number of feature vectors that are furthest from the centroid. Such sampling of feature vectors can help vary the user features that are reflected in the avatar being created for the cluster. In some embodiments, a distance between a given feature vector and a centroid (which is also a feature vector) can be determined by computing a dot product between the feature vector and the centroid.

Once respective avatars for each of the clusters have been created, the avatar module 210 associates each cluster with at least one avatar that was created for the cluster. These clusters and avatars can be pre-computed and stored as an offline process.

Figure 3:
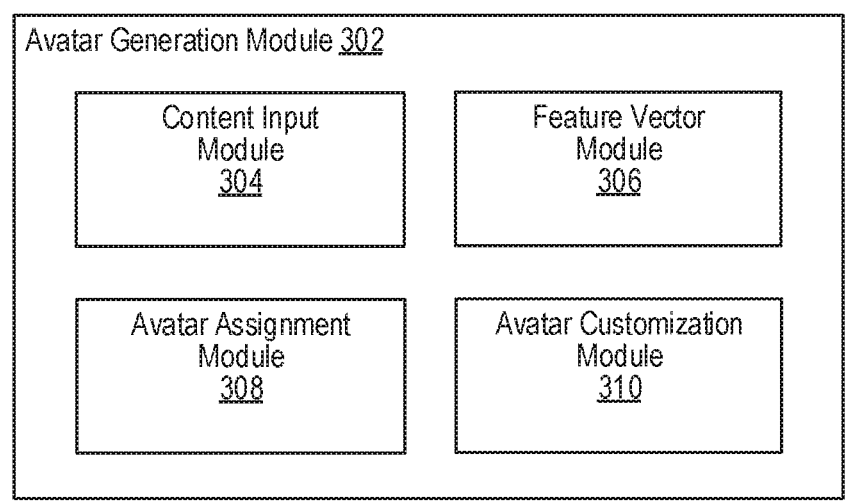
FIG. 3 illustrates an example of an avatar generation module, according to an embodiment of the present disclosure.

FIG. 3 illustrates an example of an avatar generation module 302, according to an embodiment of the present disclosure. In some embodiments, the avatar generation module 106 of FIG. 1 can be implemented as the avatar generation module 302. As shown in FIG. 3, the avatar generation module 302 can include content input module 304, a feature vector module 306, an avatar assignment module 308, and an avatar customization module 310.

In various embodiments, the avatar generation module 302 can be configured to automatically assign avatars to users. In some instances, an avatar may be assigned to a user in response to a request submitted by the user. In some embodiments, an avatar may be assigned to a user in response to the user performing some gesture. For example, a user operating a virtual reality system (e.g., virtual reality headset, touch controllers, positional tracking sensors, etc.) may sign-in and enter a virtual environment. While in this virtual environment, the user may perform various gestures that are detected by the virtual reality system. In some embodiments, the user may be assigned an avatar using the approaches described herein when the user performs a pre-defined gesture in the virtual environment.

In some embodiments, when determining an avatar for a given user, the content input module 304 can obtain one or more content items that capture various features of the user (e.g., facial features, body features, etc.). In some embodiments, these content items are provided by the user. In some embodiments, these content items are selected by the content input module 304. For example, the content input module 304 can select content items that capture various features of the user and that also received a threshold amount of user engagement (e.g., user likes, views, shares, etc.), for example, through a social networking system.

The user's avatar may be determined based on any number of content items and/or any type of content item. For example, an avatar for the user can be determined using one or more images of the user (e.g., self-portrait images or selfies). In another example, an avatar for the user can be determined using one or more videos of the user in which various features of the user are captured. In this example, the avatar may be determined using one or more video frames (e.g., video frames sampled at a pre-defined time interval). Similarly, an avatar for the user can be determined using one or more live stream broadcasts in which various features of the user are captured. The features used to determine the user's avatar can include features corresponding to the user's physical attributes (e.g., facial features, body features, hand gestures, arm positions, leg positions, skin tone, hair style, etc.) and also features corresponding to the user's emotional state or expression. In general, these features can be detected from the user's content items and subsequently captured in a feature vector corresponding to the user, as described below.

In some embodiments, the feature vector module 306 can be configured to determine a feature vector that corresponds to the user. This feature vector can be determined using the approaches described above. For example, a feature vector can be generated from a self-portrait image of the user. In some instances, when multiple content items capturing various features of the user are available, the feature vector module 306 can generate a feature vector based on the multiple content items. For example, the feature vector module 306 can generate a respective feature vector for each content item. In this example, these feature vectors can be combined (e.g., averaged) to produce a single feature vector that corresponds to the user.

After determining the feature vector that corresponds to the user, the avatar assignment module 308 can compute respective distances between the user's feature vector and centroids of each of the clusters that were generated using the process described above. In some embodiments, a distance between the feature vector and a centroid (which is also a feature vector) can be determined by computing a dot product between the feature vector and the centroid. The avatar assignment module 308 can determine the shortest distance between the user's feature vector and a centroid of a given cluster. The avatar assignment module 308 can then assign an avatar associated with this cluster to the user. As a result, features that represent the user in one domain (i.e., as captured by the content item(s)) are translated into another domain (i.e., the avatar).

In some embodiments, the avatar customization module 310 can be configured to automatically customize the avatar assigned to the user. For example, in some embodiments, one or more machine learning classifiers can be trained to detect secondary features corresponding to the user from the user's content items. In such embodiments, the user's avatar can be modified to incorporate the detected secondary features. Such secondary features can include accessories worn by the user (e.g., glasses, jewelry, etc.), cosmetic features, facial hair, types of clothing, and clothing colors, to name some examples. In some embodiments, the detected secondary features can be provided to the user for selection to allow the user to customize the assigned avatar. For example, upon detecting a pair of eyeglasses in the user's content items, the avatar customization module 310 can provide the user with an option to add eyeglasses to the user's assigned avatar. In some embodiments, the user's avatar can be modified based on user head tracking data and/or gesture data that is determined by a virtual reality system (e.g., virtual reality headset, touch controllers, positional tracking sensors, etc.). In some embodiments, the user's avatar may be modified based on the user's mouth movement (or lip movement) as captured in the user's content items. In such embodiments, the user's detected mouth movements (or lip movements) can be used to modify the representation of the user's mouth (or lips) in the avatar. In some embodiments, the user's avatar may be modified based on eye tracking data (e.g., gaze direction, glances, blinking, etc.). Additional approaches for generating avatars from media content are described in Y. Taigman, A. Polyak, and L. Wolf "*Unsupervised Cross-Domain Image Generation*," arXiv:1611.02200, 2016, which is incorporated by reference herein.

Figure 4B:
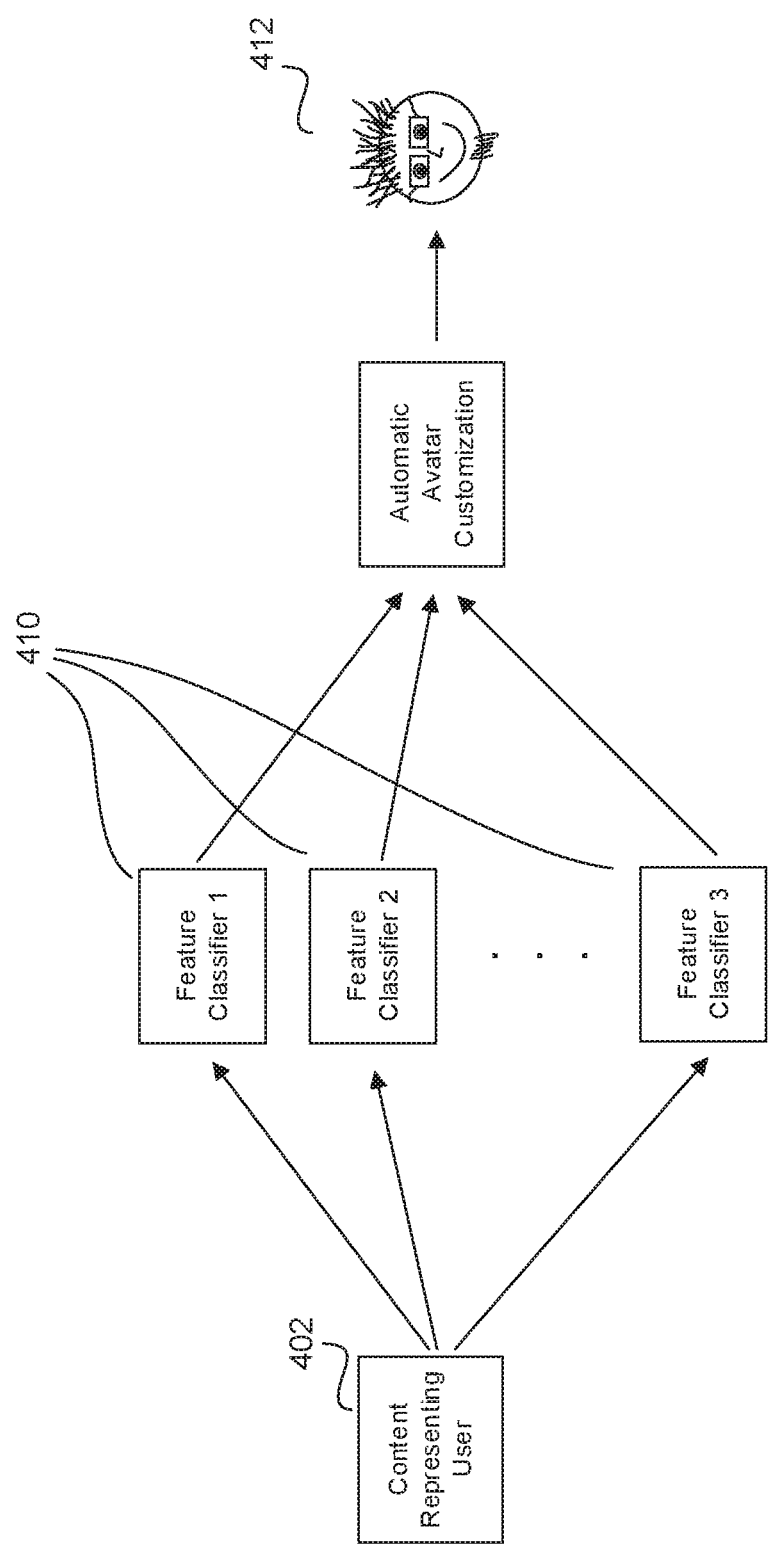

FIG. 4A illustrates an example diagram 400 in which an avatar is assigned to a user. In this example, content 402 in which various features of the user are captured is obtained. A feature vector 404 is generated from the content 402, as described above. This feature vector 404 can be evaluated against centroids of pre-computed clusters that were generated using various user features. A respective distance (e.g., dot product) between the feature vector 404 and centroids of each of the clusters can be computed. The feature vector 404 can be assigned to a cluster 406 whose centroid has the shortest distance to the feature vector 404. The user is then assigned an avatar 408 that is associated with the cluster 406. In various embodiments, there is a one-to-one relationship between clusters and avatars associated with clusters. Thus, in such embodiments, each cluster in a set of clusters is associated with a different avatar. In some embodiments, this avatar can be customized for the user. For example, as shown in FIG. 4B, the content 402 can be provided to one or more trained machine learning classifiers 410. As described above, these classifiers 410 can be trained to detect myriad features in the content 402. The features detected by the classifiers 410 can be used to modify the avatar 408. In the example of FIG. 4B, the classifiers 410 determined that the user is wearing eyeglasses, has a certain hairstyle, and a certain facial hairstyle. As a result, the avatar 408 has been modified accordingly to produce the customized avatar 412.

Figure 5:
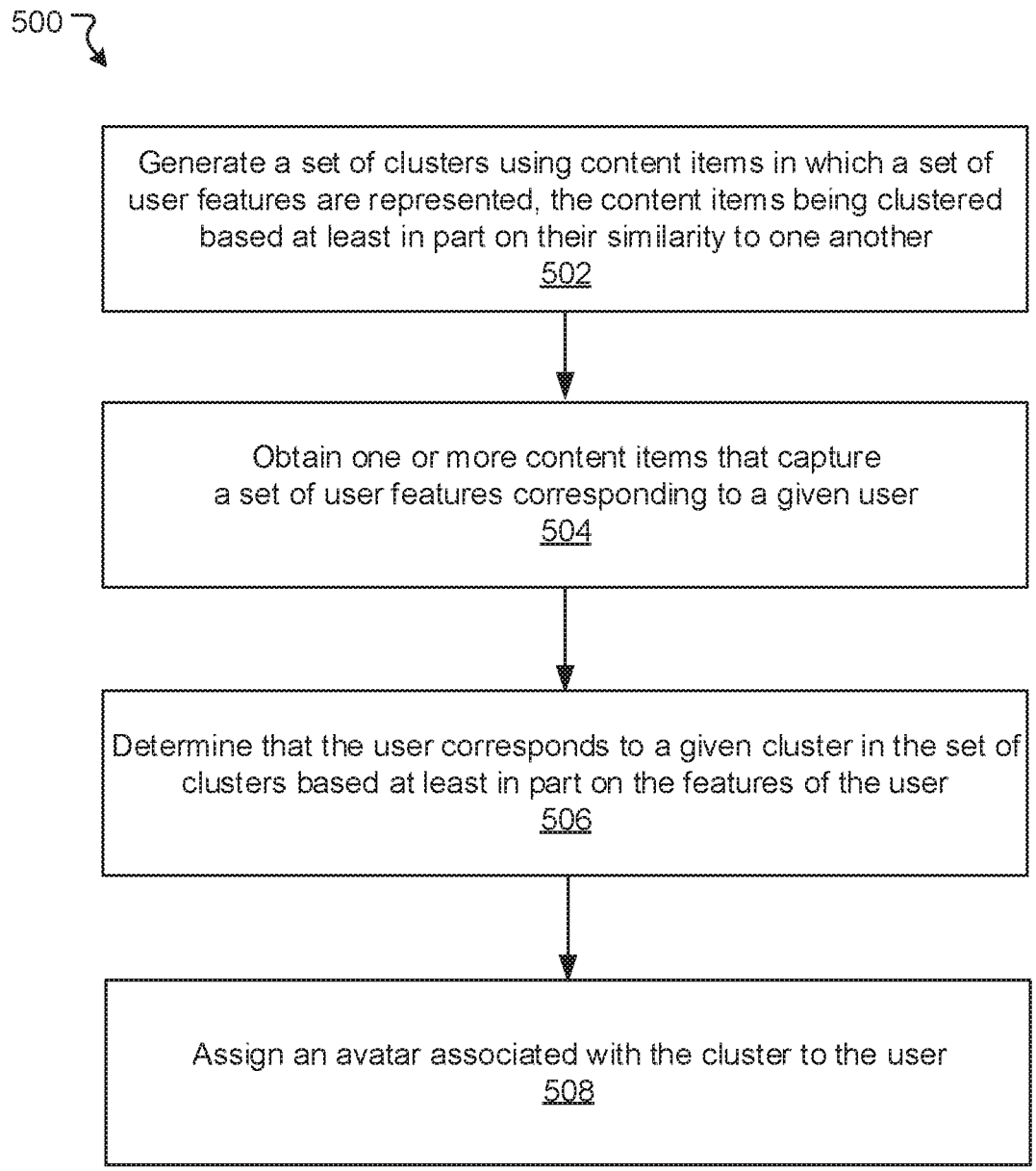
FIG. 5 illustrates an example process, according to various embodiments of the present disclosure.

FIG. 5 illustrates an example process 500 for determining topical authorities, according to various embodiments of the present disclosure. It should be appreciated that there can be additional, fewer, or alternative steps performed in similar or alternative orders, or in parallel, within the scope of the various embodiments discussed herein unless otherwise stated.

At block 502, a set of clusters can be generated using sample content items in which a set of user features are represented. The sample content items can be clustered based at least in part on their similarity to one another. At block 504, one or more content items that capture a set of user features corresponding to a given user can be obtained. At block 506, a determination can be made that the user corresponds to a given cluster in the set of clusters based at least in part on the features of the user. At block 508, an avatar associated with the cluster can be assigned to the user.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
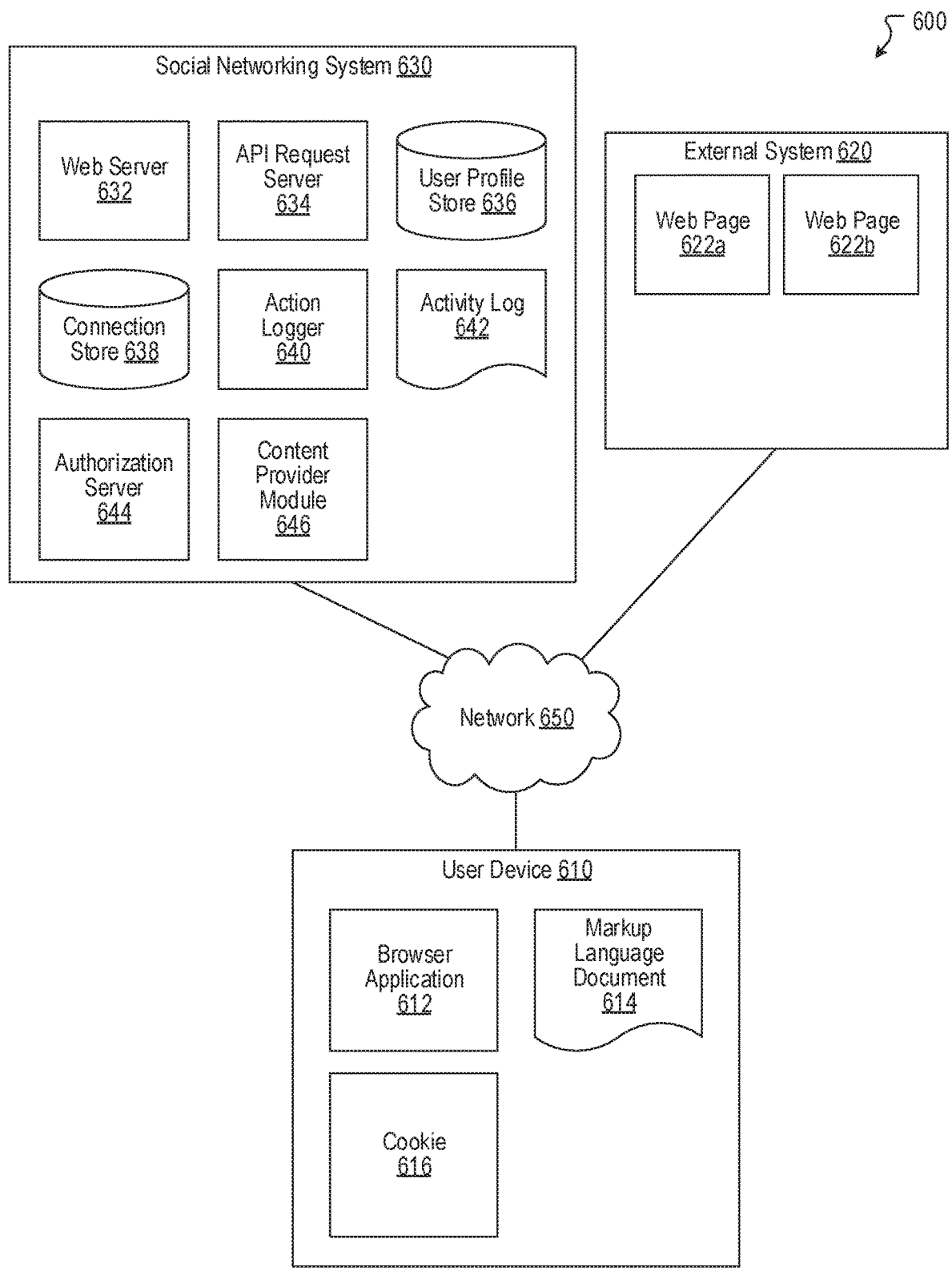
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices (or systems) that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content. As discussed previously, it should be appreciated that there can be many variations or other possibilities.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622*a* within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a content provider module 646. The content provider module 646 can, for example, be implemented as the content provider module 102 of FIG. 1. The content provider module 646 may also be implemented, in whole or in part, in the user device 610. As discussed previously, it should be appreciated that there can be many variations or other possibilities.

Hardware Implementation

Figure 7:
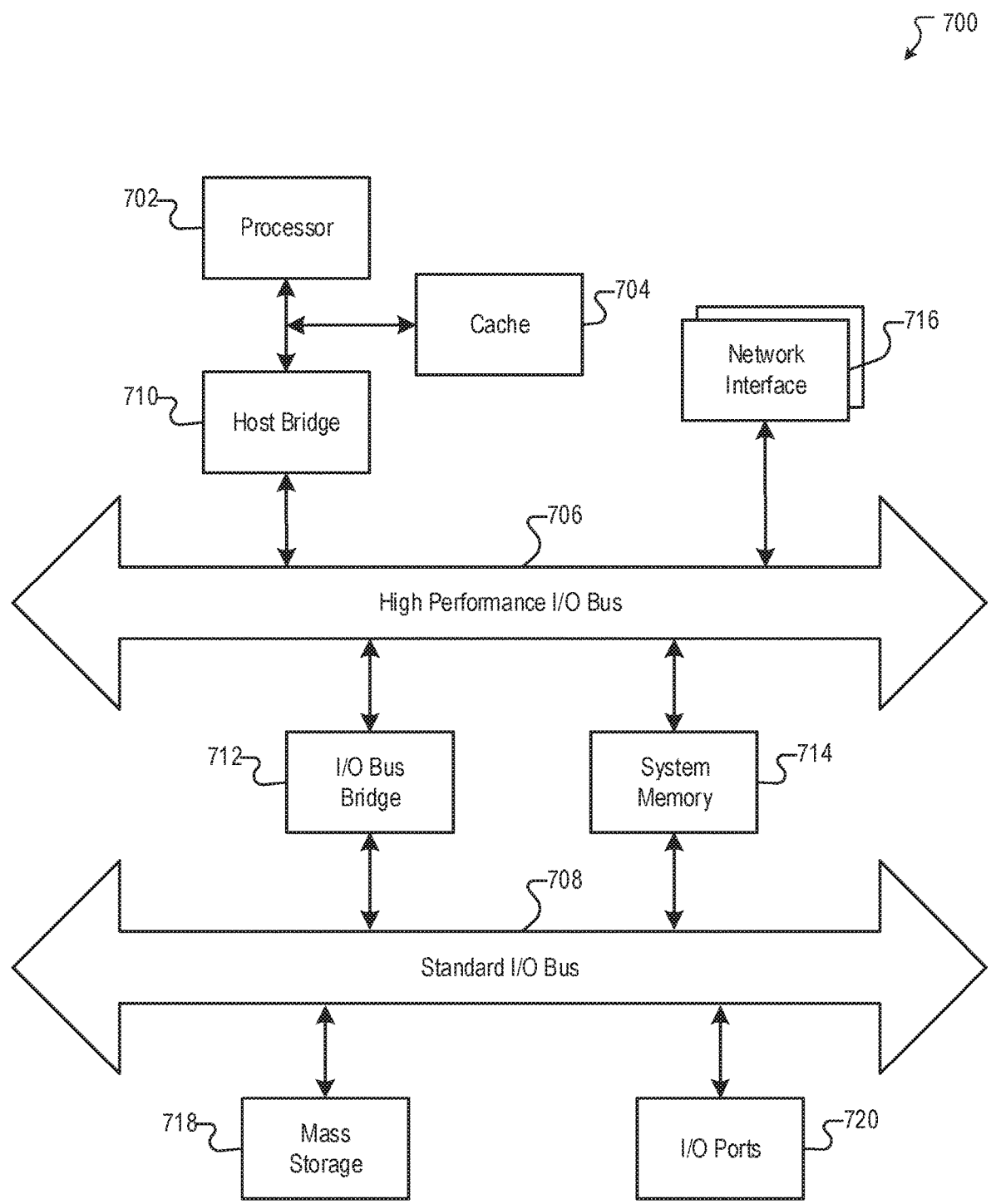
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   generating, by a computing system, a set of clusters using sample content items in which a plurality of user features of a plurality of users are represented, the sample content items being clustered based at least in part on their similarity to one another, wherein each cluster in the set of clusters is associated with a respective avatar that is representative of user features corresponding to the cluster;

obtaining, by the computing system, one or more content items that capture a set of user features corresponding to a given user;

determining, by the computing system, that the user corresponds to a given cluster in the set of clusters based at least in part on the set of user features of the user, the cluster being associated with a respective set of user features representative of at least a portion of the plurality of users and an avatar representative of the respective set of user features corresponding to at least the portion of the plurality of users; and assigning, by the computing system, the avatar associated with the cluster to the user upon the determination that the user corresponds to the cluster, wherein the avatar is representative of the user features of at least the portion of the plurality of users represented in the cluster of sample content items.

2. The computer-implemented method of claim 1, wherein each cluster in the set of clusters is associated with a respective avatar.

3. The computer-implemented method of claim 1, wherein the user features include at least one or more facial features or body features.

4. The computer-implemented method of claim 1, wherein the content items include one or more images of the user, videos that include at least one video frame of the user, or live stream broadcasts that include at least one video frame of the user.

5. The computer-implemented method of claim 1, wherein generating the set of clusters further comprises:

obtaining, by the computing system, respective feature vectors for the sample content items; and clustering, by the computing system, the respective feature vectors into the set of clusters.

6. The computer-implemented method of claim 1, wherein determining that the user corresponds to the given cluster further comprises:

determining, by the computing system, a feature vector based at least in part on the content items corresponding to the user; and determining, by the computing system, the given cluster based at least in part on a distance between a feature vector corresponding to a centroid of the given cluster and the feature vector corresponding to the user.

7. The computer-implemented method of claim 6, wherein the distance is determined based on a dot product between the feature vector corresponding to the given cluster and the feature vector corresponding to the user.

8. The computer-implemented method of claim 1, the method further comprising:

determining, by the computing system, one or more secondary features for the user; and applying, by the computing system, one or more customizations to the avatar based at least in part on the secondary features.

9. The computer-implemented method of claim 8, wherein determining the secondary features for the user further comprises:

processing, by the computing system, the one or more content items corresponding to the user using one or more machine learning classifiers that have been trained to recognize one or more of the secondary features.

10. The computer-implemented method of claim 8, wherein the secondary features include at least accessories worn by the user, cosmetic features, facial hair, type of clothing, and clothing colors.

11. A system comprising:

at least one processor; and a memory storing instructions that, when executed by the at least one processor, cause the system to perform:

generating a set of clusters using sample content items in which a plurality of user features of a plurality of users are represented, the sample content items being clustered based at least in part on their similarity to one another, wherein each cluster in the set of clusters is associated with a respective avatar that is representative of user features corresponding to the cluster;

obtaining one or more content items that capture a set of user features corresponding to a given user;

determining that the user corresponds to a given cluster in the set of clusters based at least in part on the set of user features of the user, the cluster being associated with a respective set of user features representative of at least a portion of the plurality of users and an avatar representative of the respective set of user features corresponding to at least the portion of the plurality of users; and assigning the avatar associated with the cluster to the user upon the determination that the user corresponds to the cluster, wherein the avatar is representative of the user features of at least the portion of the plurality of users represented in the cluster of sample content items.

12. The system of claim 11, wherein each cluster in the set of clusters is associated with a respective avatar.

13. The system of claim 11, wherein the user features include at least one or more facial features or body features.

14. The system of claim 11, wherein the content items include one or more images of the user, videos that include at least one video frame of the user, or live stream broadcasts that include at least one video frame of the user.

15. The system of claim 11, wherein generating the set of clusters further causes the system to perform:

obtaining respective feature vectors for the sample content items; and clustering the respective feature vectors into the set of clusters.

16. A non-transitory computer-readable storage medium including instructions that, when executed by at least one processor of a computing system, cause the computing system to perform a method comprising:

generating a set of clusters using sample content items in which a plurality of user features of a plurality of users are represented, the sample content items being clustered based at least in part on their similarity to one another, wherein each cluster in the set of clusters is associated with a respective avatar that is representative of user features corresponding to the cluster;

obtaining one or more content items that capture a set of user features corresponding to a given user;

determining that the user corresponds to a given cluster in the set of clusters based at least in part on the set of user features of the user, the cluster being associated with a respective set of user features representative of at least a portion of the plurality of users and an avatar representative of the respective set of user features corresponding to at least the portion of the plurality of users; and assigning the avatar associated with the cluster to the user upon the determination that the user corresponds to the cluster, wherein the avatar is representative of the user features of at least the portion of the plurality of users represented in the cluster of sample content items.

17. The non-transitory computer-readable storage medium of claim 16, wherein each cluster in the set of clusters is associated with a respective avatar.

18. The non-transitory computer-readable storage medium of claim 16, wherein the user features include at least one or more facial features or body features.

19. The non-transitory computer-readable storage medium of claim 16, wherein the content items include one or more images of the user, videos that include at least one video frame of the user, or live stream broadcasts that include at least one video frame of the user.

20. The non-transitory computer-readable storage medium of claim 16, wherein generating the set of clusters further causes the computing system to perform:

obtaining respective feature vectors for the sample content items; and clustering the respective feature vectors into the set of clusters.

\* \* \* \* \*